United States Patent [19]

Menon et al.

[11] Patent Number: 5,375,128
[45] Date of Patent: Dec. 20, 1994

[54] FAST UPDATING OF DASD ARRAYS USING SELECTIVE SHADOW WRITING OF PARITY AND DATA BLOCKS, TRACKS, OR CYLINDERS

[75] Inventors: Jaishankar M. Menon, San Jose; James M. Kasson, Menlo Park, both of Calif.

[73] Assignee: IBM Corporation (International Business Machines Corporation), Armonk, N.Y.

[21] Appl. No.: 600,034

[22] Filed: Oct. 18, 1990

[51] Int. Cl.⁵ ........................... H03M 13/00
[52] U.S. Cl. ........................... 371/40.1; 395/575
[58] Field of Search ............ 371/40.1, 10.2, 10.1, 371/40.4, 51.1, 37.1, 13, 9.1, 21.1, 24, 22.1; 395/575

[56] References Cited

U.S. PATENT DOCUMENTS

| | | | |
|---|---|---|---|
| 4,092,732 | 5/1978 | Ouchi | 364/900 |
| 4,375,100 | 2/1983 | Tsuji et al. | 371/38 |
| 4,517,663 | 5/1985 | Imazeki et al. | 371/13 |
| 4,688,221 | 8/1987 | Nakamura et al. | 371/13 |
| 4,761,785 | 8/1988 | Clark et al. | 371/51 |
| 4,989,205 | 1/1991 | Dunphy, Jr. et al. | 371/10.1 |
| 4,989,206 | 1/1991 | Dunphy, Jr. et al. | 371/10.1 |
| 5,088,081 | 2/1992 | Farr | 369/54 |
| 5,130,992 | 7/1992 | Frey, Jr. et al. | 371/40.1 |

OTHER PUBLICATIONS

Jim Gray, "Notes on Data Base Operating Systems" Operating Systems and Advanced course, Copyright 1979 Springer Verlag, pp. 394–481.
D. A. Patterson et al., "A Case For Redundant Arrays of Inexpensive Disks (RAID)", ACM SIGMOD Conference, Chicago Ill., Jun. 1–3 1988.
Brady et al., "Method And Means For Accessing DASD Arrays With Tuned Data Transfer Rate And Concurrency" U.S. Ser. No.: 07/528,999, filed May 24, 1990.

Primary Examiner—Robert W. Beausoliel, Jr.
Assistant Examiner—Phung My Chung
Attorney, Agent, or Firm—R. Bruce Brodie

[57] ABSTRACT

A method for update writing in an array of DASDs in a reduced number of DASD track cycles. The method involves distributing data and parity blocks for each parity group across the array in failure independent form and reserving unused space. During a first cycle, the old data and parity blocks are read. The new parity is calculated and shadow written into reserved unused space located before the old parity block recurs. The amended data is either written in place during a second cycle or shadow written into reserved space during a subsequent portion of the first cycle.

13 Claims, 4 Drawing Sheets

FLOW OF CONTROL

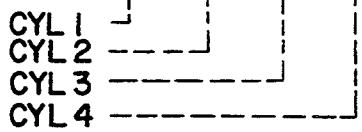 CYLINDER 2 IS A PARITY CYLINDER
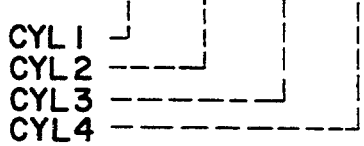 CYLINDER 2 IS A PARITY CYLINDER
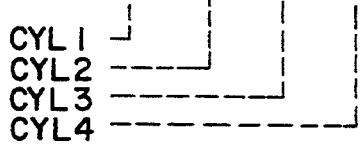 CYLINDER 2 IS A PARITY CYLINDER
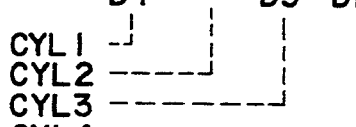 CYLINDER 2 IS A PARITY CYLINDER
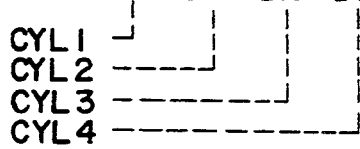 CYLINDER 1 IS A PARITY CYLINDER
FLOATING PARITY TRACK VARIANT
ARRAY FORMATTING
FIG. 2

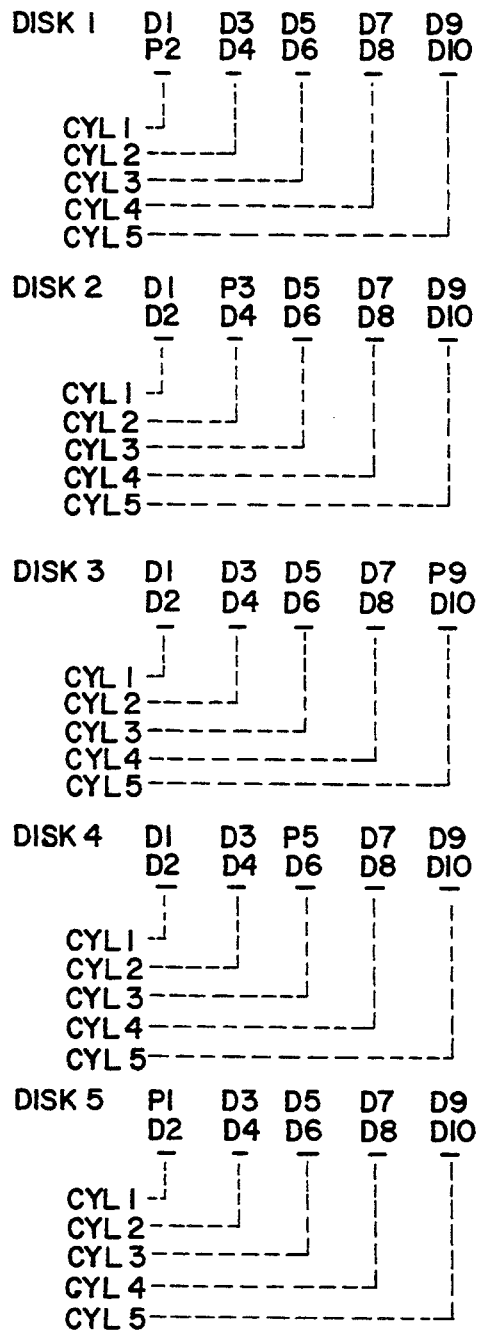

FLOW OF CONTROL

FAST UPDATING OF DASD ARRAYS USING SELECTIVE SHADOW WRITING OF PARITY AND DATA BLOCKS, TRACKS, OR CYLINDERS

FIELD OF THE INVENTION

This invention relates to arrays of direct access storage devices (DASDs), and more particularly, to methods and means for reducing the number of track rotations required to write modify a data block and alter the explicit parity of a group of data blocks including any modified block distributed across at least some DASDs.

DESCRIPTION OF RELATED ART

Fast computers include DASD arrays as part of their storage subsystems. Array architecture, and organization and distribution of data influence operating performance, fault tolerance and the speed of data rebuild after a fault has occurred. The prior art shows that improvements in array performance turn on subtle tuning of array operations.

Storage Subsystems, DASDs, Strings, and Arrays

A "storage subsystem" attaches a processor or processor array at its I/O boundary over a broadband data and control path. The subsystem may consist either of a single cyclic multitrack magnetic information storage device (DASD) individually accessed through its device adapter; several DASDs (denominated a "string") terminating in a common control unit; or an array of DASDs attached by a DASD array controller (DAC).

A "DASD array" is any set of logically related DASDs operable by common mode or means. It includes any a set of synchronously selected and operated DASDs. These are used where information is exchanged at a high data rate between fast processors and external storage. Serial to parallel mapping of data blocked at some predetermined size (byte, word, block) sustains the high data rate. The synchronous behavior requires N DASDs to rotate at the same rpm, have the same angular offset, and be simultaneously accessed in an identical manner. This solution while maximizing data transfer rate minimizes concurrency.

Another type of DASD array comprises a set of DASD related together by the fact that data rendered unavailable through failure of any one DASD can be recovered through the use of redundancy such as parity stored on surviving DASD. Such an array need not necessarily be synchronously operated.

Aspects of the DASD Array

Mathematically an "array" is a subscripted variable in which the subscript indexes the relative position order of each instance of the variable; specifically, the position order of each block in the logical track. The components of the subscript also define the dimensions of the array. Thus, array $A(i,j)$ specifies a variable "A" whose relative positions are mapped onto a two dimensional closed integer intervals $(1,1 < (i,j) < N, K)$.

The array dimensions may be mutually exclusive. Thus, the dimensions represented by the closed integer intervals $1 < i < N$ and $1 < j < K$ could denote an ordering (indexing) of like devices and time respectively, N and K being integer upper bounds. By convention, column order designates one array dimension and row order designates the other. In this regard, N is the number of DASDs and K is the number of blocks per DASD per track thereof.

Any physical arrangement of N DASDs synchronously accessed constitutes a DASD array. Relatedly, the formatting and subsequent accessing of an array, as a store proceeds by inserting values in consecutive positions on either a row or a column basis. If the operation is performed in a column direction, it is performed in "column major order". Likewise, if performed in a row direction, it is performed in "row major order".

Redundancy, Storage Subsystems, and Recovery Strategies

Storage subsystems are subject to fault or error. Relatedly, there are several strategies for returning such systems to a point of information consistency just prior the system faulting. These include
(1) processing a transaction log from a known checkpoint,
(2) duplication of the entire storage contents and backup switching, or
(3) data reconstruction using special purpose codes and only a portion of the stored data.

The first strategy relies upon log based recovery and emphasizes recreating event history. However, it inhibits current processing until completed.

The second strategy of duplication of complete DASD contents does not require interruption of current operations. Yet, duplication (sometimes called mirroring) does require significant additional storage resource/cost even though only a small fraction of the data may be rendered unavailable.

The third strategy, using coded data and minimizing additional storage, requires computational resources and a complex storage model. The special purpose coded information termed "parity" is stored on the DASD with the data and is redundant. For purposes of this invention, "parity" is defined to be any redundancy computationally usable with that portion of available data to recover an unavailable portion. It may include simple parity, Hamming, Reed-Solomon, ECC codes and the like.

A distinction is drawn in the literature between "fault tolerance" and operation in "degraded mode". Also, a distinction is drawn between "fault", "error" and "erasure". For purposes of this invention, "tolerance" is the number of DASDs which could be made unavailable permitting continued operation of the system. "Degraded mode" designates the continued system operation after a fault. "Fault" is the occurrence of a permanent failure. "Error" is the occurrence of a false value in a data sequence often due to noise or a random or intermittent failure of software or hardware. Last, "erasure" designates the omission of any value in one or more positions in a data sequence.

Gray, Patterson, and Brady et al. Illustrate the Range of Recovery Strategies

James N. Gray in "Notes on Database Operating Systems", Operating Systems—An Advanced Course, copyright 1979 Springer Verlag, pages 393–481 describes log based recovery for database and transaction management systems with pointers necessary to recreate history. This is necessary to roll back the system to a known point of prior consistency (checkpoint). After the rollback, the log drives the redo of the transactions.

Patterson et al., "A Case for Redundant Arrays of Inexpensive Disks (RAID)", ACM SIGMOD Conference, Chicago, Ill., Jun. 1-3, 1988, and Brady et al, U.S. Ser. No. 07/528,999, filed May 24, 1990, (SA9-89-028) "Method and Means for Accessing DASD Arrays with Tuned Data Transfer Rate and Concurrency" relate to recovery at the storage management level.

Patterson et al. covers duplexing or "mirroring" data on array DASDs and parity encoding. In this regard, the mirroring of data stored on N array DASDs requires at least 2N DASDs. As both Patterson and Brady point out, the combined use of parity encoding of a portion of the data, and an increase in the number of accesses per storage update use less than 2N DASDs.

Brady et al also discloses the mapping of a sequential file of N*K data and parity blocks, K blocks per track per DASD, onto a two dimensional array (one spatial and one temporal dimension) by synchronously accessing N DASD's through counterpart controllers for the duration of one track revolution.

Distributing Blocks from Same Logical Files Across DASDs, Parity Coding, and Fault Tolerance Parity coding permits data to be rebuilt using only a portion of the stored data. It saves storage compared to the amount used in duplexing and saves time relative to log based recovery. The performance suffers by an increase in the number of accesses per write update. Ouchi and Clark first taught distributing data and parity blocks from the same logical file over attached DASDs as a fault tolerance and recovery aid.

Ouchi, U.S. Pat. No. 4,092,732, "System For Recovering Data Stored In A Failed Memory Unit", issued on May 30, 1978. He disclosed the spreading of data blocks from the same logical file across a string of N−1 failure independent DASDs and recording a parity block on the Nth DASD. According to Ouchi, the parity block is a XORing (modulo 2 addition) of the binary coded contents of the N−1 other blocks. Contents from any single inaccessible DASD can be recovered by XORing the parity blocks with the blocks stored on the N−2 remaining accessible DASDs. A similar result can be obtained if the parity blocks are not available.

Clark et al., U.S. Pat. No. 4,761,785, "Parity Spreading to Enhance Storage Access", issued Aug. 2, 1988, modifies Ouchi by distributing parity blocks over DASDs such that the absence of one DASD (i.e. the parity DASD in Ouchi) would avoid rendering all parity blocks unavailable especially for operation in degraded mode. In this regard, Ouchi and Clark can tolerate up to one DASD failure and continue operation after rebuilding the data back.

Patterson's DASD Array Levels

Patterson describes several different array architectures. His description and classification of data and DASD configuration into "levels" has become a de facto typology. That is, a given array is characterized as being a RAID Level 1-5.

Patterson's levels 1 and 2 relate to one or more strings of DASD and utilizing data mirroring (data duplexing) and Hamming encoding respectively.

Patterson's third level is one where read and write operations are synchronously made to N DASD's. In this arrangement, N−1 DASD's contain data and one DASD contains a parity ranging over the other data DASDs. That is, one check DASD is provided for the group. The contents of the failed DASD can be reconstructed in the manner of Ouchi. Parenthetically, he performs a logical record to physical track mapping and accessing onto a DASD array in column major order thereby accommodating both small and large access requests.

The fourth level improves performance with respect to small read and write accesses. This is achieved by storing blocks along the column extent so that in a first time slot (DASD sector 1) blocks 1 to N can respectively be stored on DASD 1 to N while in the second time slot (DASD sector 2) blocks N+1 to 2N are stored etc. In the Kth time slot (DASD sector K) blocks [(K−1)]*N+1 to KN are stored on corresponding devices.

Patterson's last and the fifth level distributes data and parity blocks across all array DASDs and encourages small reads and writes attending transaction processing as well as large reads and writes attending numerically intensive computing.

RAID levels 3 to 5 may use at least one extra DASD for sparing in the event one of the array DASD faults. In this regard, reference may be made to Dunphy, U.S. Pat. No. 4,914,656, "Disk Drive Memory", issued Apr. 3, 1990.

Write Updating

Assume that in a RAID type 4 array of DASDs, the blocks D1, D2, D3, and D4 of a file are laid across four DASDs in any order and counterpart parity blocks P1-P4 are written on a parity DASD. The blocks are arranged in Table 1 as follows:

TABLE 1

| DASD1 | D1 | D2 | D3 | D4 |
| DASD2 | D1 | D2 | D3 | D4 |
| DASD3 | D1 | D2 | D3 | D4 |
| DASD4 | D1 | D2 | D3 | D4 |
| DASD5 | P1 | P2 | P3 | P4 |

P1 is the modulo 2 addition (XOR) of D1 over DASD1-DASD4. P2, P3, and P4 cover D2, D3, and D4 respectively. If DASD1 were to fail its contents could be recreated on a spare DASD, by the XOR of the contents of DASD2-DASD5

Whenever a storage subsystem (DASD array controller) receives a request to write a data block, it must also update the corresponding parity block for consistency. If D1 is to be altered, then P1 must be recalculated where:

new P1:=(old D1) XOR (new D1) XOR (old P1).

This requires four DASD array accesses in order to write modify or write update a data block. That is (1) read old data, (2) read old parity, (3) write new data, and (4) write new parity. It is the case, that the storage subsystem (array controller) writes the new data and parity in the same DASD locations as the old data and parity. This is termed "writing in place".

It follows that the DASD locations are a full disk rotation away just after they have been read. Conventionally, the storage subsystem reserves both the DASDs and a path from the processor to the DASDs during the disk rotation interval between reading the old information and writing the new information. In a typical storage subsystem, there are provided four paths from the processor to a 32 or 64 DASD array. Path reservation between the old information read and the update write substantially reduces path concurrency. However, it may well mean that a path is not available when a write update is attempted.

SUMMARY OF THE INVENTION

It is an object of this invention to enhance utilization of a storage subsystem formed from DASD arrays of RAID type 4 or 5 where information is stored as blocks of data and parity and arranged together in explicit parity groups.

It is related object to devise a method to reduce the number of track rotations required to write modify a data block and alter the explicit parity of that group of data blocks containing the modified data block distributed across at least some of the DASDs in a DASD array.

It is another related object to optimize both the occupancy and concurrency of the path to the data through the storage subsystem.

The above objects are satisfied by a method which utilizes DASD disk space to shadow write parity or data or both on a block, track, or cylinder level. Shadow writing rather than writing in place increases speed while management of the array sparing capacity ensures a high probability of a nearly instant free block extent to perform the shadow writing. The method variations include (1) Double Parity, (2) Floating Parity Track, (3) Floating Data and Parity Track, and (4) Floating Data and Parity Block.

The Double Parity Method variant assumes $N-2$ accessed disk tracks, from $N-2$ different failure independent DASD and two parity tracks from another DASD. In this version, each DASD track supports K blocks/track. Each parity track stores K parity blocks defined over $N-2$ data blocks in column major order. Relatedly, there are 2K parity blocks (K per parity track) of which only K are in use at one one time, and K are free.

The method write updates by first reading the old block and old parity in one track revolution. Next, it calculates the new parity (XOR of old values of data blocks and group parity and new data block value). During the second revolution of the DASD containing the data block, it writes the new data block in place. The new value of parity is shadow written in the first available table controlled free space on the parity tracks. Lastly, the tables are modified to indicate that the old parity block space is available.

Illustratively, if $p=0.5$ is the population proportion of free parity blocks, then the probability of the availability of a free parity block can be found in 1 block time is $$1-p2=1-(0.5)^2=0.75.$$

The Floating Parity Track Method variant extends double parity and models storage as N data cylinders from N failure independent DASD of $T-1$ tracks per cylinder at K blocks per track. Parity is organized as a cylinder of parity tracks. Each of the $(T-1)$ tracks records K blocks of vertical parity of the counterpart data tracks from each of the N data cylinders. One parity track of K blocks is left free.

In the floating parity variant, the write update requires two track revolutions of the DASD containing the data block. One revolution to read the old data and one to write the new data in place. It also requires a fraction of a revolution to read the old parity and a fraction of a revolution to shadow write new parity in the first available place in the parity cylinder.

The Floating Data and Parity Track Method variant extends the floating parity method by shadow writing both data and parity. This variant models storage as a cylinder of N synchronous tracks of M data blocks per track and a parity track of M blocks. All of the tracks are accessed from $N+1$ failure independent DASD's.

Lastly, the Floating Data and Parity Block Method variant extends the floating parity method by shadow writing both data and parity. This variant models storage as $(N+1)$ data and parity cylinders, one from each of the $(N+1)$ failure independent DASDs. Each cylinder has T tracks of K blocks per track. One track of K blocks is left free on each of the $(N+1)$ cylinders. The K free blocks are table managed and may reside anywhere on the cylinders. The remaining $(T-1)$ tracks or $K*(T-1)$ blocks on each cylinder may contain either data or parity.

BRIEF DESCRIPTION OF THE DRAWING

FIG. 2 illustrates the cylinder and track layout for data and parity blocks over a DASD array according to the Floating Parity Track variant of the method.

FIG. 3 shows the cylinder and track layout for data and parity blocks according to the Floating Data and Parity Track variant of method.

FIG. 4 sets forth the cylinder and track layout for data and parity blocks over a DASD array according to the Floating Data and Parity Block variant of the method.

DESCRIPTION OF THE PREFERRED EMBODIMENT

A Typical DASD Array and Its Accessing Environment

Figure 1:
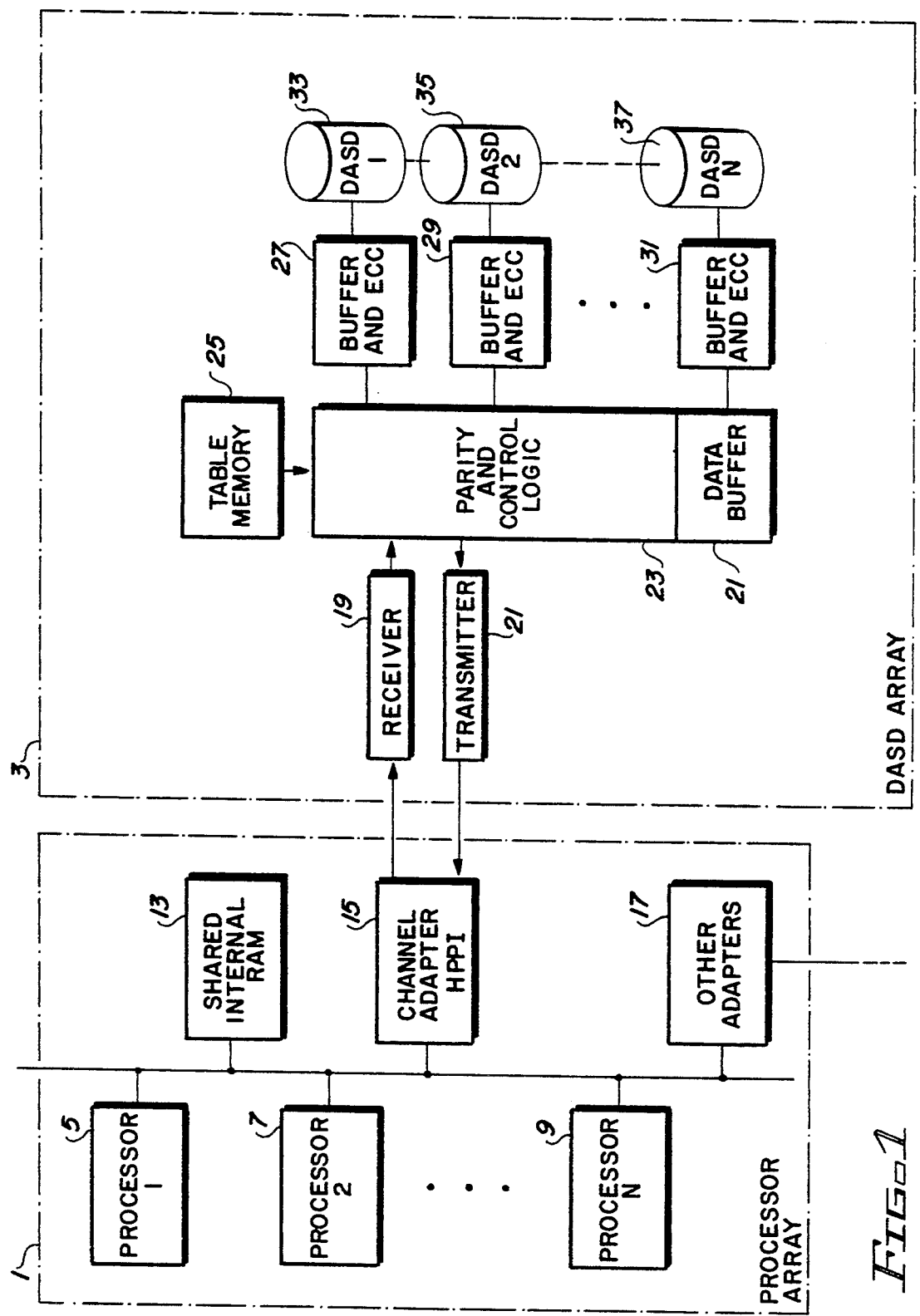
FIG. 1 depicts data flow between a processor array and an external storage subsystem formed from a DASD array.

Referring now to FIG. 1, there is shown a system including an array of processors 1 coupling as external storage a synchronous DASD array 3. The processors 5, 7, 9 may be of the high performance variety. Attached external storage in the form of DASD array 3 is coupled to array 1 by way of adapter 15. Other information processing sources or sinks such as local area networks, printers, or displays would likewise be coupled over counterpart adapters 17.

DAS 3 preferably comprises a RAID-type 4 or 5 DASD array and an associated array DAC 23 as described for example in the Patterson reference and in the co-pending Brady et al application.

Referring again to FIG. 1, there is shown an array controller (elements 19–31) coupling the host bus 11 by way of channel adapter 15. This path provides access to all system resources including memory 13 and global registers. Adapter 15 preferably attaches DAS over a pair of simplex megabyyte rate receive and transmit interfaces 19, 21. The interfaces may be OEMI or High Performance Parallel Interfaces (HIPPI) are described in the ANSI Draft Standard of Aug. 29, 1989, X3T9/88-127, Revision 6.8.

Data movement in the Host/DAS direction starts from internal memory 13 over bus 11 through adapter 15, receiver 19, ending in data buffer 21. The control logic determines from table memory 25, the device and block numbers that contain the old data and the old parity. The control logic then causes these blocks to be read via ECC circuits 27, 29, and 31. Each block is protected by appending ECC bytes for error detection and correction on an intra-block basis. Parity logic then calculates the new value of parity. Using table memory 25, DASD locations to write new data and parity are found according to one of the four variants of the method of this invention and the new data and parity blocks are written thereto. Finally, table memory 25 is updated to reflect the new locations of data and parity. Data movement in the DASD/processor host direction starts from DASD 33, 35, 37 through ECC circuits 27, 29, 31 to the data buffer 21. The data is then moved from the buffer through the transmitter to adapter 15 over bus 11 and to internal memory 13 of the processor host.

Terminology

To assist exposition of the preferred embodiment, the following terms are employed:

| | |
|---|---|
| T | number of tracks per cylinder |
| C | number of cylinders per DASD |
| m | number of blocks per track |
| B | block size in bytes |
| d | number of DASDs in the array |
| n | column size (number of data tracks per column) |
| TS | size of tables needed in DASD controller |

The following calculated quantities are used:
Storage efficiency: $= 1/(1 + 1/n)$
Table overhead: TS/(size of data on DASDs)

It should be appreciated that a "parity group" is a unit of consistency and recovery. It comprises a predetermined number of data blocks defined over failure independent DASDs. It may also include one or more parity blocks from different DASDs. A parity block within the parity group contains the parity of all the data blocks in the parity groups. If a block from the parity group becomes unreadable, it can be recreated from the remaining blocks in that group. For the Floating and Data Block variant to be described, a the term "column" is the synonym of the term "single parity group". However, for the other variants, the term "column" is a synonym for the term "K parity groups".

Double Parity Variant of the Method

In this method, two parity tracks are reserved on a DASD to protect n data tracks from n other DASDs, but use only half of the blocks in the parity tracks at any given time. The parity now occupies 2/n times as much space as the data, for a storage efficiency of $1/(1+2/n)$. Consider an example expressed in Table 2 with five DASDs, each with one cylinder of five tracks, with one block per track and a column size of 3.

TABLE 2

| DASD1 | D1 | P3 | P3 | D4 | D5 |
|---|---|---|---|---|---|
| DASD2 | D1 | D2 | P4 | P4 | D5 |
| DASD3 | D1 | D2 | D3 | P5 | P5 |
| DASD4 | P1 | P1 | D2 | D3 | D4 |
| DASD5 | P2 | P2 | D3 | D4 | D5 |

The two parity tracks P1 on DASD4 protect data on the three D1 tracks on DASDs 1,2 and 3. The example distributes the parity among the 5 DASDs in the array, although one could dedicate two DASDs out of the five to hold parity. In the example, the two parity tracks that protect three data tracks are stored on the same DASD (e.g., both P2 tracks are on DASD 5), but the two parity tracks of a column could be on two separate DASDs. Performance can be improved by putting both parity tracks of a column on the same DASD.

For the double parity scheme, with distributed parity and with both parity tracks of a column on the same DASD, the controller can use all tracks on all DASDs if T*C (the number of tracks per DASD) is an integer multiple of (n+2) and the number of columns is an integer multiple of the number of DASDs.

Operation of Double Parity Variant

To understand how the double parity method works, consider a single column of 3 data tracks and 2 parity tracks, with four blocks per track as depicted in Table 3.

TABLE 3

| B1 | B2 | B3 | B4 | |
|---|---|---|---|---|
| B5 | B6 | B7 | B8 | 3 data tracks (on 3 different DASDs) |
| B9 | B10 | B11 | B12 | |
| P1 | P2 | P3 | P4 | 2 parity tracks (on same DASD) |
| P5 | P6 | P7 | P8 | |

Initially, the parity of blocks B1, B5 and B9 are stored in P1, of blocks B2, B6 and B10 in P3, of blocks B3, B7 and B11 in P5 and of B4, B8 and B12 in P7. Blocks B1, B5, B9 and parity block P1 constitute a "parity group" and there are four groups per column in the Table 3 example.

Since blocks P2, P4, P6 and P8 are empty and available, the DAC must have a means to know which parity blocks are used and which are available. To accomplish this, the DAC maintains a bitmap, called a "free space table", for every column in the array. In the Table 3 example, each bitmap would occupy 8 bits, one for each parity block in the column, to indicate which blocks are empty and which are available. When the system is initialized, the bit map would appear as

| 1 | 0 | 1 | 0 |
|---|---|---|---|
| 1 | 0 | 1 | 0 |

To keep track of the storage location of the parity the DAC stores a "parity address table" per column. A parity address table corresponding to the above bitmap would be expressed as 1,3,5,7

This indicates that the parity for the first group of blocks is in P1, the parity for the second group is in P3, the parity for the third group is in P5 and the parity for the fourth group is in P7.

Given the existence of the parity address table, the free space table contains redundant information. Yet, it is quicker to search when looking for a free block.

Consider an update to block B7. The DAC first determines the column to which the block belongs, so it knows which parity address and free space tables to access. Then, it calculates that block B7 is part of group 3, and accesses the third entry in the parity address table. This entry is 5, and tells the DAC that parity for block B7 is currently in P5. The DAC now examines the free space table, looking for the nearest free block into which the new value of parity may be written. The nearest free block may be on either of the two parity tracks. From the free space table, the controller determines that P2 and P6 are both currently free, and that either location may be used to contain the new value of parity for the third group. It chooses P6, since it is adjacent to the current location P5.

The DAC now proceeds as follows:
(1) Read old value from block B7.
(2) Write new value of B7 whenever appropriate.
(3) Read old value of P5.
(4) In gap between P5 and P6, exclusive OR the old values of P5 and B7 with the new value to be written to B7.
(5) Write this result to P6.

The reading of P5 and the writing of P6 is done in a single access to the disk containing the parity tracks for the column being updated. Two accesses are still required to the disk containing the data B7—one to read the old value and one to write back the new value. After the DAC modifies the parity, it updates the free space table to:

| 1 | 0 | 1 | 0 |
|---|---|---|---|
| 0 | 1 | 0 | 1 | and the parity address table to 1,3,6,7 to indicate that the parity of group 3 is now in P6 and that P5 is now available for use.

DESCRIPTION OF THE PREFERRED EMBODIMENT (CONTINUED)

Double Parity Variant Performance

The double parity method improves performance in two ways. First, it reduces the service time for the read and write of parity by almost an entire revolution of the DASD disk. Secondly, it reduces DASD utilization, since either the DASD can be released one revolution earlier than otherwise possible, or back-and-forth motion of the DASD arm caused by releasing the DASD before the write is eliminated. Path utilization is also reduced if the DAC 23 was otherwise reserving the path between the read and the write of parity. The combined effects of these factors is likely to be substantial.

In many systems, it is not practical to reserve the path from the DAC to the data DASD for the entire revolution between the read and the write of data because this path is shared among a large number of DASDs. Therefore, reading the old data block and writing the new data block would be accomplished with two DASD accesses. However, the DASD array controller DAC 23 may read the old parity and write the new parity in a single access if the time between these two events is short compared to an average access. The following calculation demonstrates this to be the case.

At any time, ½ the parity blocks in a column are free. In our example, if P2 and P6 were both occupied, the DAC 23 would determine if P3 or P7 were available. Preferably, the system should be organized with both parity tracks of a column in the same physical cylinder. It is assumed that the DASDs use dedicated servo. If the DASDs use embedded servo, then head-switch times are quite long, and only P6 and P7 would be practical locations to write parity.

There are several ways to ensure that both parity tracks of a column are on the same physical cylinder.

One method is to isolate parity cylinders from data cylinders, and to use a DASD in which T (the number of tracks per cylinder) is a multiple of 2. The controller DAC 23 would repeat this procedure until it found an available block for writing new parity.

The probability that a free parity block can be found in one block time is $$1-(0.5)^2=0.75.$$

Assuming m (the number of blocks per track) is infinitely large and letting x be the probability that a free block is found one block away, the expected number of blocks to a free parity block is $$x+2x(1-x)+3x((1-x)^2)+4x((1-x)^3)+\ldots$$

which is $1/x$. For the double parity method, $x=0.75$ and the expected number of blocks to search is 1.33.

Floating Parity Track Variant of the Method

The Floating Parity Track variant of the method offers higher storage efficiency than the Double Parity variant. In the Floating Parity Track variant, all cylinders on every DASD in the array are designated as either parity cylinders, which contain only parity tracks, or as data cylinders, which contain only data tracks. Every parity cylinder contains parity data for $T-1$ columns (T is the number of tracks per cylinder). Each column consists of n data tracks from n different DASDs and a parity track (of m blocks) on yet another DASD. The m blocks in a parity track need not all be physically on the same track, as will be apparent shortly. Normally the space in a parity cylinder can store parity information for T columns. The floating parity track approach leaves m free blocks in the parity cylinder and uses them for enhancing performance.

Referring now to FIG. 2, there is illustrated the cylinder and track layout for data and parity blocks over a DASD array according to the Floating Parity Track variant of the method. FIG. 2 depicts an example using $d=5$ DASDs, each DASD with $C=4$ cylinders, $T=4$ tracks per cylinder and $m=1$ block per track. The column size is chosen as $n=4$.

As before, Pi on a DASD protects Di from each of four other DASDs. On DASD1, the second cylinder serves exclusively as a parity cylinder. The DAC 23 stores only three parity tracks on each parity cylinder, with the fourth track left free. Our example shows the floating parity track array implemented with distributed parity. Each DASD in the array must have $$TC/(1+(T/(n*(T-1)))) \text{ data tracks and}$$

$$TC-(TC/(1+(T/(n*(T-1))))) \text{ parity tracks.}$$

To use all tracks on all DASDs, the number of data tracks and the number of parity tracks must both be multiples of T.

Operation of Floating Parity Variant

Consider 3 columns, each with $n=3$ data tracks $+1$ parity track. Given a column number and knowledge of the placement algorithm used to store columns, the location of the parity track can be generated. Referring now to Table 4, there is shown an example using DASDs with $T=4$ tracks per cylinder and $m=4$ blocks per track. All three columns whose parity is stored in the same parity cylinder are shown.

TABLE 4

| B1  | B2  | B3  | B4  | B13 | B14 | B15 | B16 | B25 | B26 | B27 | B28 | These are |
|-----|-----|-----|-----|-----|-----|-----|-----|-----|-----|-----|-----|-----------|
| B5  | B6  | B7  | B8  | B17 | B18 | B19 | B20 | B29 | B30 | B31 | B32 | nine data |
| B9  | B10 | B11 | B12 | B21 | B22 | B23 | B24 | B33 | B34 | B35 | B36 | tracks    |
| P1  | P2  | P3  | P4  | This is a parity cylinder |||||||||
| P5  | P6  | P7  | P8  | with four tracks, 3 with  |||||||||
| P9  | P10 | P11 | P12 | parity, and one left      |||||||||
| P13 | P14 | P15 | P16 | unused                    |||||||||

In the example of Table 4, B1 through B12 and P1 through P4 represents the first column, B13 through B24 and P5 through P8 represents the second column and B25 through B36 and P9 through P12 represents the third column. To start with, the parity of blocks B1, B5 and B9 is stored in P1, of blocks B2, B6 and B10 in P2, of blocks B3, B7 and B11 in P3 and of B4, B8 and B12 in P4. Blocks P5 through P8 contain parity for the data blocks B13 to B24, all of which are in the same column (P5 is the parity for B13, B17 and B21, etc.). Also, P9 to P12 is the parity for the column of data blocks B25 through B36. P13 through P16 is initially free. The DAC 23 uses a 16-bit free space table (one bit for each block in the parity cylinder) for every parity cylinder on every DASD to indicate which blocks are empty and which are available. When the DAC 23 initializes the array, the free space table for one cylinder appears as:

| 1 | 1 | 1 | 1 |
|---|---|---|---|
| 1 | 1 | 1 | 1 |
| 1 | 1 | 1 | 1 |
| 0 | 0 | 0 | 0 |

The DAC 23 also stores a parity address table per parity cylinder in the DASD array as follows:

1,2,3,4,5,6,7,8,9,10,11,12

The parity address table contains $m(T-1)$ entries, one for every group of blocks in every column whose parity is stored in the parity cylinder. In the Table 4 example, the DAC 23 stores parity for three different columns in the same parity cylinder, and there are four groups of blocks in each of these three columns, requiring 12 entries in the parity address table.

The parity address table indicates that parity for the first group of blocks from the first of three columns is in P1, parity for the second group of blocks from the first of three columns is in P2, and so on. The last entry indicates that parity for the last group of blocks in the third column is in P12.

Consider an update to block B7. The DAC 23 first determines the column to which the block belongs, so it knows which parity cylinder contains the parity data for block B7. Thus, it knows which parity address and free space tables to access. It also figures out that the column of interest is the first of the three columns whose parity is mapped to that parity cylinder. Then, it calculates that block B7 is part of group 3, and accesses the third entry in the parity address table. This entry is 3, and tells the DAC 23 that parity for block B7 is currently in P3. From the free space table, the DAC 23 ascertains if one of P4, P8, P12 or P16 is free, and establishes that P16 is. Therefore, it chooses P16 as the new home for the parity information. If none of those four blocks had been free, the DAC 23 would next have looked to see if one of P1, P5, P9 or P13 were free, and so on.

The DAC 23 now proceeds as follows:
(1) Read old value from block B7.
(2) Write new value of B7 whenever appropriate.
(3) Read old value of P3.
(4) In gap between P3 and P16, exclusive OR the old values of P3 and B7 with the new value to be written to B7.
(5) Write this result to P16.

The DAC 23 reads P3 and writes P16 in a single access to the DASD containing the parity tracks for the column being updated. The DAC 23 still needs two accesses to the DASD containing the data B7—one to read the old value and one to write back the new value. After the update of the parity is completed, the DAC 23 updates the free space table to:

| 1 | 1 | 0 | 1 |
|---|---|---|---|
| 1 | 1 | 1 | 1 |
| 1 | 1 | 1 | 1 |
| 0 | 0 | 0 | 1 | and the parity address table to:

1,2,16,4,5,6,7,8,9,10,11,12 to indicate that the parity of the third group in the first column is now in P16 and that P3 is now available for use.

Floating Parity Track Variant Performance

As before, reading the old data block, and writing the new data block take two DASD accesses. However, the DAC 23 can read the old parity and write the new parity with a single access, since it has to wait only a short time between these two events, as shown by the following calculation.

At any time, a parity cylinder has m free blocks so that the probability that any one block is free is $m/mT$ or $1/T$. Consider again the update of P3. The new value of parity can be written one block away if any of P4, P8, P12 or P16 are free. The DAC 23 may write the new parity a single block away if any of T possible next blocks are free. This probability is:

$$1-((T-1)/T)^T$$

For T=16, this probability is 0.644. Reasoning as before, the expected number of blocks to be searched until a free block is found is 1/0.644 or 1.55.

Floating Data and Parity Track Variant of the Method

The essence of the floating parity track method can be extended to include data tracks as well as parity tracks. One way to generalize the scheme is to leave a track (m blocks) free on every cylinder (a cylinder now has both data and parity tracks). Each column consists of n data tracks (of m blocks) from n different DASDs and a parity track (of m blocks) on yet another DASD. The m blocks in a track need not all be physically on the same track, as will be apparent shortly.

Referring now to FIG. 3, there is shown the cylinder and track layout for data and parity blocks according to the Floating Data and Parity Track variant of the method. In FIG. 3, there is depicted an example using five DASDs, each DASD includes C=5 cylinders, T=3 tracks per cylinder, and m=1 block per track. A column size of n=4 has been chosen.

As before, Pi on a DASD protects Di from each of four other DASDs. One track from every cylinder is free, so that only (T−1)*C tracks from each DASD are utilized. Of these, $$C*(T-1)/(1+(1/n))$$

are data tracks and the rest are parity tracks. For purposes of calculation, the C unused tracks on every DASD count as overhead tracks that decrease storage efficiency. To use all tracks on all DASDs, the number of data tracks and the number of parity tracks must both be multiples of T−1.

Floating Data and Parity Block Variant of the Method

Finally, consideration is given to a variant of the method in which a block is left free on every cylinder. In this variant, a column is defined in terms of blocks rather than tracks—n data blocks from n different DASDs and a parity block on yet another DASD.

Referring now to FIG. 4, the cylinder and track layout for data and parity blocks over a DASD array according to the Floating Data and Parity Block variant of the method is laid out. In FIG. 4, an example is shown with a column size of n=3 using four DASDs, each DASD with C=1 cylinder, T=3 tracks per cylinder, and m=3 blocks per track.

As before, Pi on a DASD protects Di from each of three other DASDs, but one block is left free in the cylinder. Only C(mT−1) blocks from each DASD DASD are utilized. Of these, $$C*(mT-1)/(1+(1/n))$$

are data blocks and the rest are parity blocks. The C unused blocks on every DASD count as overhead blocks and add to the number of parity blocks to determine the total overhead for this method. To use all blocks on all DASDs, the number of data blocks and the number of parity blocks must both be multiples of mT−1.

Operation of Floating Data and Parity Block Variant of the Method

Consider the example below in Table 5 using four DASDs, each DASD having T=4 tracks per cylinder, and m=4 blocks per track. A column size of n=3 has been chosen.

| A1 | A2 | A3 | A4 | |
|---|---|---|---|---|
| A5 | A6 | A7 | A8 | A cylinder containing data, |
| A9 | A10 | A11 | A12 | parity and 1 free block |
| A13 | A14 | A15 | A16 | |
| B11 | B2 | B3 | B4 | |
| B5 | B6 | B7 | B8 | A cylinder containing data, |
| B9 | B10 | B11 | B12 | parity and 1 free block |
| B13 | B14 | B15 | B16 | |
| C1 | C2 | C3 | C4 | |
| C5 | C6 | C7 | C8 | A cylinder containing data, |

-continued

| C9 | C10 | C11 | C12 | parity and 1 free block |
|---|---|---|---|---|
| C13 | C14 | C15 | C16 | |
| D1 | D2 | D3 | D4 | |
| D5 | D6 | D7 | D8 | A cylinder containing data, |
| D9 | D10 | D11 | D12 | parity and 1 free block |
| D13 | D14 | D15 | D16 | |

Four cylinders from four different DASDs are shown. The DAC 23 stores the parity of A1, B1 and C1 in D1, of A2, B2 and C2 in D2, and so on. The parity of A15, B15 and C15 is in D15, with A16, B16, C16 and D16 being left free. There is a free space table for every cylinder on every DASD; each free space table has a single entry which indicates the location of the free block in the cylinder. At initialization, the free space tables illustratively appear as:

| 16 |
|---|
| 16 |
| 16 |
| 16 |

The DAC 23 also stores a parity address table per cylinder in the DASD array which looks as below for our four cylinders.

| 1,2,3,4,5,6,7,8,9,10,11,12,13,14,15 |
|---|
| 1,2,3,4,5,6,7,8,9,10,11,12,13,14,15 |
| 1,2,3,4,5,6,7,8,9,10,11,12,13,14,15 |
| 1,2,3,4,5,6,7,8,9,10,11,12,13,14,15 |

For the 15 blocks in a cylinder containing either data or parity, the parity address table indicates the current block within the cylinder at which it is stored.

Consider an update to the third block in the first of the four cylinders shown. From the parity address table for this cylinder, the DAC 23 determines that this block is stored at A3, and it then determines the cylinder containing the parity data for the block to be updated. The DAC 23 then accesses the parity address table for this cylinder and determines that parity is stored at D3. From the respective free space tables, the DAC 23 determines that A16 on the first cylinder and D16 on the last cylinder are free. On the DASD containing the first cylinder, the DAC 23 reads data from A3 and writes new data to A16 in a single access. Having obtained the value in A3, the DAC 23 next reads D3, calculates new parity and writes it into D16 in another access.

The final values of the free space tables are

| 3 |
|---|
| 16 |
| 16 |
| 3 | and of the parity address tables are

| 1,2,16,4,5,6,7,8,9,10,11,12,13,14,15 |
|---|
| 1,2,3,4,5,6,7,8,9,10,11,12,13,14,15 |
| 1 2,3,4,5,6,7,8,9,10,11,12,13,14,15 |
| 1,2,16,4,5,6,7,8,9,10,11,12,13,14,15 |

Performance of Floating Data and Parity Block Variant

Since the free block in a cylinder could be anywhere, on the average there is a half revolution delay between the read and write of data or parity. It is debatable whether the read and the write can be done in a single access, since it may still be unacceptable to hold the path between DASD and DAC 23 for half a revolution.

The performance improvement of this variant over the traditional parity method is ½ a revolution in service time and reduced DASD utilization caused by the fact that the DASD can be released in ½ a revolution, rather than having to wait the entire revolution. If the path between the DASD and the DAC 23 is released between the read and the write, there is no reduction in the number of accesses needed over the traditional parity method.

Consider the following analysis of service time which is only valid at low I/O rates when there is no device queueing. For the traditional parity method, the time to read and then write a block on a DASD is avg_seek+latency (0.5 revolution)+1 revolution+1 block_write and it is avg_seek+latency (0.5 revolution)+0.5 revolution+1 block_write for the floating data and parity block method. Using 3 msecs for average seek, 16 msecs for a DASD revolution and 1 msec for a block write, the time to read and write a block is reduced from 28 msec to 20 msec.

Figure 5:
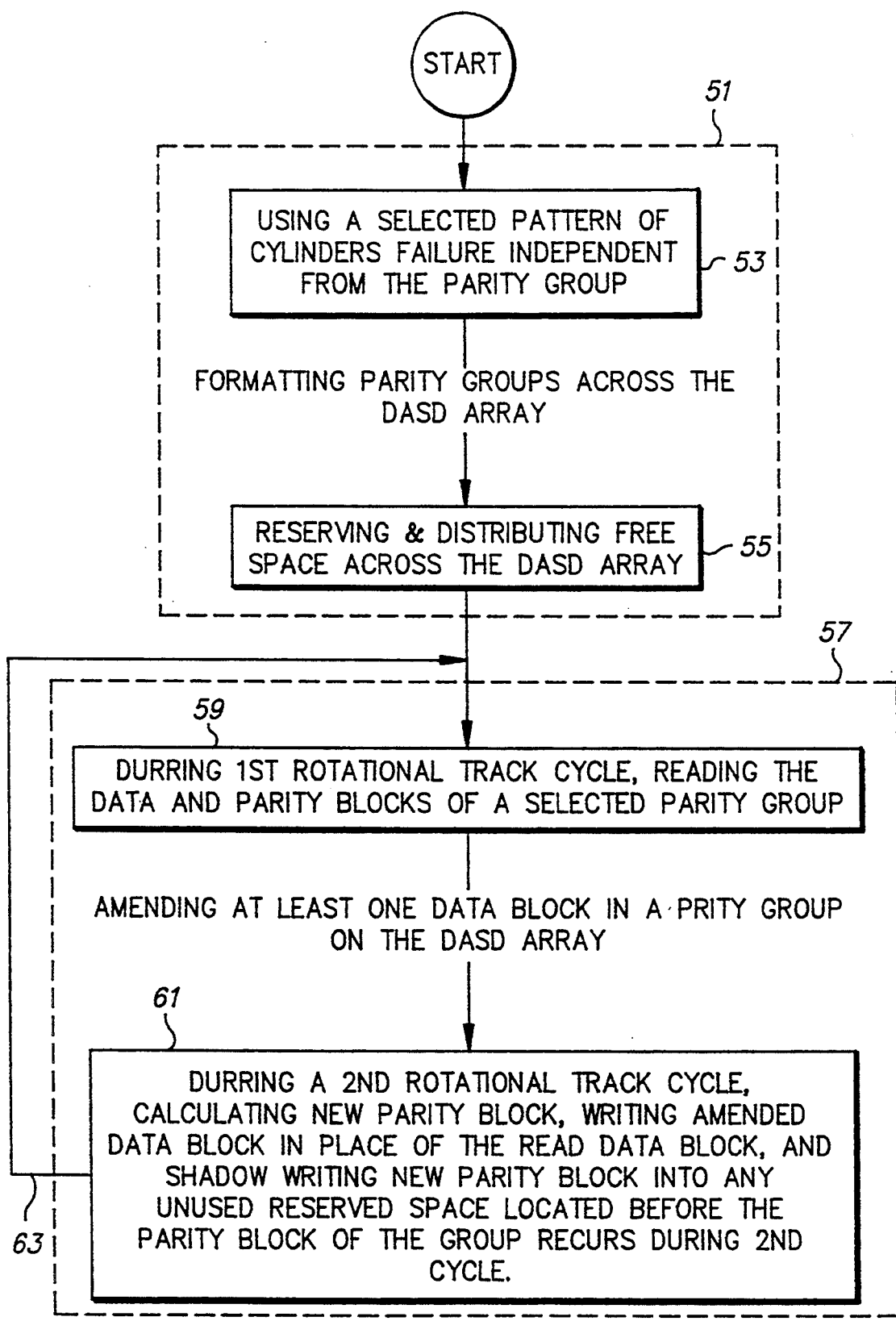
FIG. 5 depicts a flow of control according to the method of this invention including a preparatory formatting and space reservation step and a multi-cyclic step responsive whenever an update write occurs.

Referring now to FIG. 5, there is depicted a flow of control according to the method of this invention including a preparatory formatting and space reservation step 51 and a multi-cyclic step 57 responsive whenever an update write occurs.

The preparatory step 51 of formatting the parity groups across the array includes step 53 of using a pattern cylinders selected from a set of patterns and step 55 in which free space is distributed across the DASD array in excess of the number of parity groups.

The multi cyclic step 57 becomes invoked during each update write. It includes step 59 of reading the data and parity blocks of a selected parity group during a first rotational track cycle. This is followed by step 61 in which a new parity block As calculated, the amended data block is written in place of the old data block, and the new parity block is shadow written into any available unused space located before the parity block of the preselected parity groups recurs during a second track cycle. The reset response by step 57 after completion is shown by path 63.

Extensions

The Floating Parity Track variant can be extended to leave more than one track free per parity cylinder. The Floating Data and Parity Track variant can be extended to leave more than one track free per cylinder. Lastly, the Floating Data and Parity Block variant can be extended to leave more than one block free per cylinder.

Of the four variants, the Floating Parity Track variant exhibits low parity overhead, low table (free space map, parity address table) overhead, and optimal performance. The two variants, Floating Parity Track and Floating Data and Parity Track, are appropriate only for DASD arrays with fast head switching times. The other variants, Double Parity and Floating Data and Parity Block, are operable with DASD arrays having slow head switching times.

These and other extensions of the invention may be made without departing from the spirit and scope thereof as recited in the appended claims.

We claim:

1. A method for reading and update writing of parity groups of data and explicit parity blocks across an array of DASDs in a reduced number of DASD rotational track cycles, comprising the steps of:
   (a) distributing the data and parity blocks for each parity group across the DASDs in the array in failure independent form and reserving unused DASD space; and
   (b) amending at least one data block in a preselected parity group resident on said array by:
      (1) during a first rotational track cycle, reading the said at least one data block and the parity block of the preselected parity group from said array; and
      (2) during a second rotational track cycle,
         (i) calculating a new parity block,
         (ii) shadow writing at least the new parity block into the reserved unused space nearest in rotational relation to the location of said data block, and
         (iii) writing an amended data block in place of said one data block.

2. The method according to claim 1, wherein during the latter portion of the first track cycle, the step of shadow writing the amended data block in the reserved unused space as an alternative to that of writing in place during the second track cycle, and further wherein during the second track cycle, the step of calculating the new parity block further includes logically combining via modulo 2 addition the data and parity blocks accessed during the first track cycle and the amended data block.

3. A method for updating parity groups formed from at least one data and counterpart explicit parity blocks written across a preselected number of DASDs in an array, said DASDs constituting a cyclic multi-track storage medium, comprising the steps of:
   (a) formatting the parity groups across the array by:
      (1) using a pattern selected from a set of patterns consisting of blocks, tracks, and cylinders, said selected pattern being failure independent from the parity group over which said parity blocks are defined, and,
      (2) reserving and distributing also across said array free space counterpart to the parity groups in the selected formatted pattern and in excess of a number of said parity groups; and
   (b) amending at least one data block in a preselected parity group resident on said array by:
      (1) during a first rotational track cycle, reading the said at least one data block and parity block of the preselected parity group from said array; and
      (2) during a second rotational track cycle,
         (i) calculating a new parity block,
         (ii) writing an amended data block in place of said one data block, and
         (iii) shadow writing at least the new parity block into any available reserved unused space located before the parity block of said preselected parity group recurs during said second track cycle.

4. The method according to claim 3, wherein during the second track cycle, the amended data block is shadow written into any available free space not reserved for parity located and before the original data block recurs during the second track cycle.

5. A method for minimizing a number of accesses required to amend a parity group from a set of parity groups, each group being formed from one or more data blocks and explicit parity blocks written across an array of N DASD's, said DASDs constituting a cyclic multi-track storage medium, comprising the steps of:
   (a) formatting the explicit parity blocks on the DASD array in a pattern, each parity block in said pattern being failure independent from the data blocks of the group over which said parity block is defined, and, reserving and distributing free parity block space thereon such that the parity block space is in excess of amount of space required to have one parity block for every parity group; and
   (b) amending at least one data block in a preselected parity group resident on said array by:
      (1) during a first rotational track cycle, reading the said at least one data block and parity block of the preselected parity group from said array; and
      (2) during a second rotational track cycle,
         (i) calculating a new parity block,
         (ii) writing an amended data block in place of said one data block, and
         (iii) shadow writing at least the new parity block into any available reserved unused space located before the parity block of said preselected parity group recurs during said second track cycle.

6. The method according to claim 5, wherein each explicit parity block is defined over a predetermined group of data blocks located on failure independent tracks in column major order.

7. The method according to claim 5, wherein the formatting step includes the step of arranging the explicit parity blocks and reserved free parity block spaces in a preselected track or cylinder format failure independent from the groups, and maintaining tables indicating which of the parity block spaces are available and the address of the parity block covering the group containing a data block to be amended.

8. The method according to claim 7, wherein the amending step includes ascertaining from the tables the next free space available to writing an amended parity block.

9. A method for minimizing a number of accesses required to amend a parity group from a set of parity groups, each parity group being formed from one or more data blocks and an explicit parity block written across an array of N DASD's, N being an integer greater than 1, said DASDs constituting a cyclic multi-track storage medium, comprising the steps of:
   (a) formatting each parity group of the set on the DASD array across dedicated data and parity cylinders in a pattern, said blocks of each group being stored on failure independent DASDs, and, reserving and distributing fees parity block space on the parity cylinders such that the parity block space is in excess of an amount of space required to have one parity block for every parity group; and
   (b) amending at least one data block in a preselected parity group resident on said array by:
      (1) during a first rotational track cycle, reading the said at least one data block and parity block of the preselected parity group from said array; and
      (2) during a second rotational track cycle,
         (i) calculating a new parity block,
         (ii) writing an amended data block in place of said one date block, and
         (iii) shadow writing at least the new parity block into any available reserved free space on a cylinder located before the parity block of said preselected parity group recurs during said second track cycle.

10. The method according to claim 9, wherein each of the N DASDs in the array is formatted to include at least one parity cylinder having T tracks and containing parity for $T-1$ columns, each one of the $T-1$ parity tracks being a modulo 2 addition of n data tracks located on $N-1$ failure independent DASD cylinders, T being an integer greater than 1.

11. The method according to claim 9, wherein the formatting step includes the step of arranging the explicit parity blocks and reserved free parity block spaces in a preselected track or cylinder format failure independent from the groups, and maintaining tables indicating which of the parity block spaces are available and the address of the parity block covering the group containing a data block to be amended.

12. The method according to claim 9, wherein the formatting step is modified such that the free data block space is reserved on all cylinders, and further wherein the amending step is modified such that the amended data block is shadow written to the first available free space on any cylinder.

13. In a system having an array of N logically related to failure independent DASDs, N being an integer greater than 1; parity determining means; and means for reading and writing parity groups of data and explicit parity blocks across counterpart tracks of the DASDs, the writing means comprising:
   (a) means for distributing the data and parity blocks for each parity group across the DASDs in the array in failure independent form and for reserving unused DASD space; and
   (b) means for amending at least one data block in a preselected parity group resident on said array by:
      (1) during a first rotational track cycle, reading the said at least one data block and the parity block of the preselected parity group from said array; and
      (2) during a second rotational track cycle,
         (i) calculating a new parity block,
         (ii) shadow writing at least the new parity block into the reserved unused space nearest in rotational relation to the location of said data block, and
         (iii) writing an amended data block in place of said one data block.

* * * * *

UNITED STATES PATENT AND TRADEMARK OFFICE
CERTIFICATE OF CORRECTION

PATENT NO. : 5,375,128
DATED : Dec. 20, 1994
INVENTOR(S) : J. Menon et al

It is certified that error appears in the above-indentified patent and that said Letters Patent is hereby corrected as shown below:

Column 9, line 23  delete "0   1   0   1" and add
                    --0   1   1   0--

Column 15, line 47 delete "As" and add --is--

Signed and Sealed this

Twelfth Day of September, 1995

Attest:

BRUCE LEHMAN

Attesting Officer        Commissioner of Patents and Trademarks